(12) United States Patent
Kai

(10) Patent No.: US 7,144,036 B2
(45) Date of Patent: Dec. 5, 2006

(54) AIR BAG APPARATUS

(75) Inventor: Takeshi Kai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 10/946,400

(22) Filed: Sep. 20, 2004

(65) Prior Publication Data
US 2005/0062270 A1    Mar. 24, 2005

(30) Foreign Application Priority Data
Sep. 22, 2003    (JP)    ............................. 2003-329548

(51) Int. Cl.
*B60R 21/16* (2006.01)
(52) U.S. Cl. ................. 280/731; 280/743.1; 280/743.2
(58) Field of Classification Search ................ 280/731, 280/743.1, 743.2, 730.1, 732
See application file for complete search history.

(56) References Cited

U.S. PATENT DOCUMENTS

| | | | | |
|---|---|---|---|---|
| 4,958,565 A | * | 9/1990 | Koch | .......................... 102/386 |
| 5,887,894 A | * | 3/1999 | Castagner et al. | ........ 280/743.2 |
| 6,113,134 A | * | 9/2000 | Lim | .......................... 280/730.1 |
| 6,736,426 B1 | * | 5/2004 | Winters et al. | ........... 280/743.2 |
| 6,981,719 B1 | * | 1/2006 | Igawa | ...................... 280/743.2 |
| 7,021,657 B1 | * | 4/2006 | Kassman et al. | ......... 280/743.2 |
| 2002/0096871 A1 | * | 7/2002 | Pinsenschaum et al. | . 280/743.2 |
| 2004/0075261 A1 | * | 4/2004 | Damian et al. | ........... 280/743.2 |
| 2004/0212186 A1 | * | 10/2004 | Kai | ......................... 280/743.2 |

FOREIGN PATENT DOCUMENTS

| JP | | 2666689 | | 6/1997 |
|---|---|---|---|---|
| JP | | 200340065 A | * | 2/2003 |

* cited by examiner

*Primary Examiner*—Paul N. Dickson
*Assistant Examiner*—Joselynn Y. Sliteris
(74) *Attorney, Agent, or Firm*—Hamre, Schumann, Mueller & Larson, P.C.

(57) ABSTRACT

An air bag apparatus, includes: an inflator; an air bag having a corner portion that is projectable radially outwardly and a guide portion that is provided on a back side of a surface to face an occupant of the vehicle; and a strip that is disposed in an interior of the air bag so that a deployment shape of the air bag is controlled by virtue of a tensile force acting on the strip. The strip has one end that is fixed to the corner portion. The air bag has a mounting portion at which the other end of the strip is fixed. The strip is arranged to pass through the guide portion slidably to be fixed to the mounting portion at the other end thereof.

3 Claims, 11 Drawing Sheets

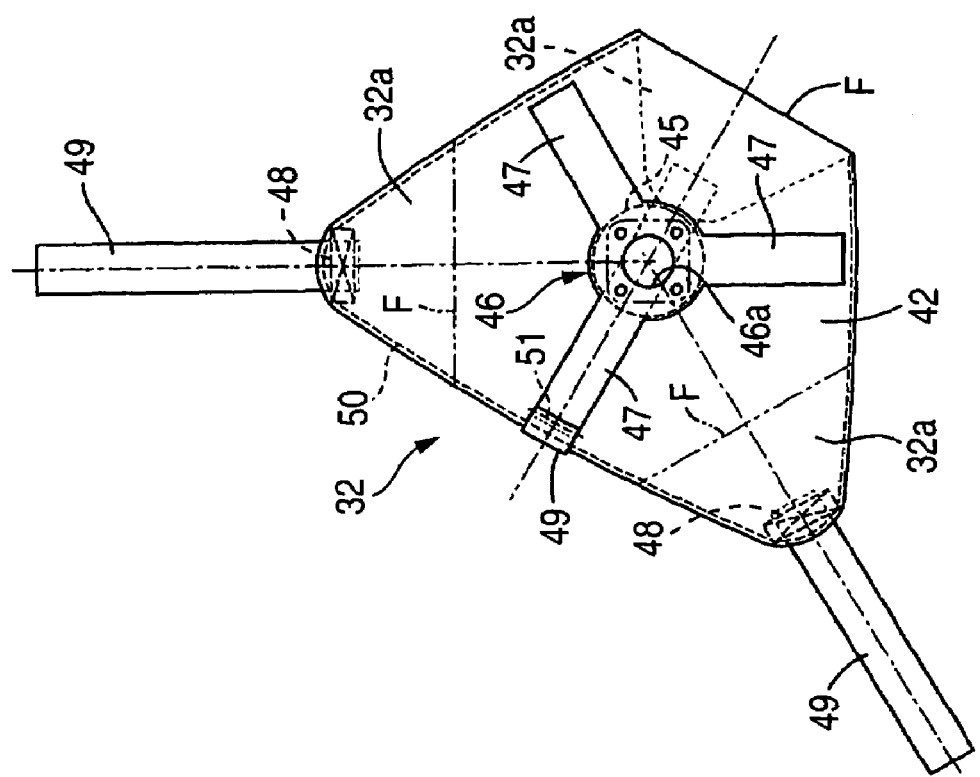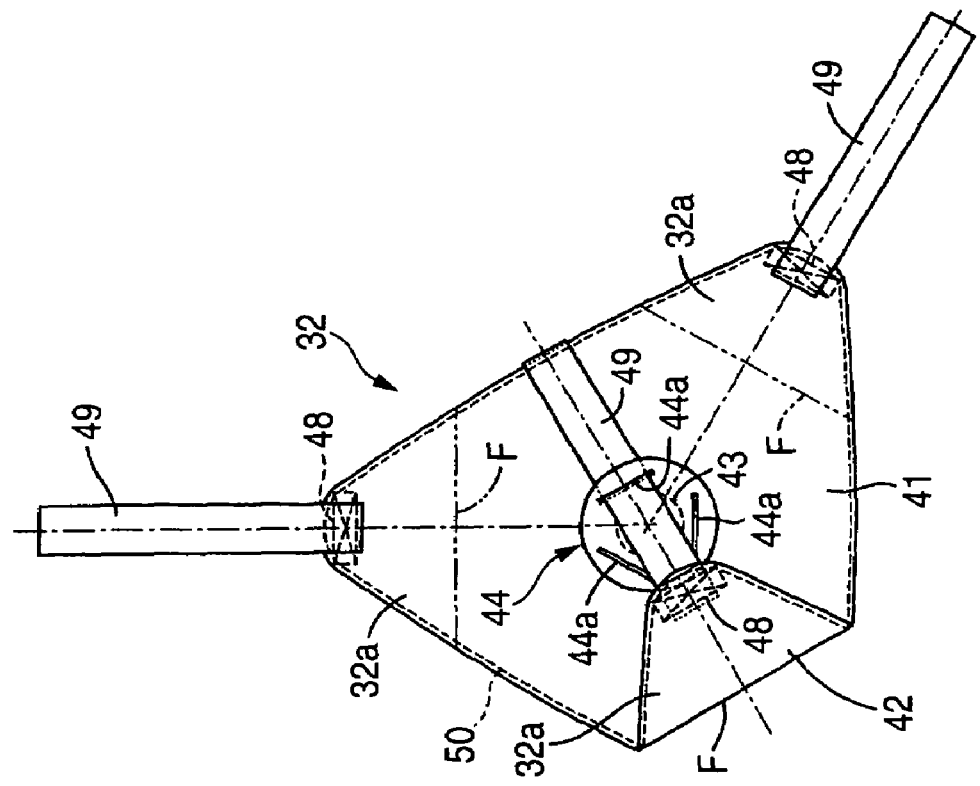

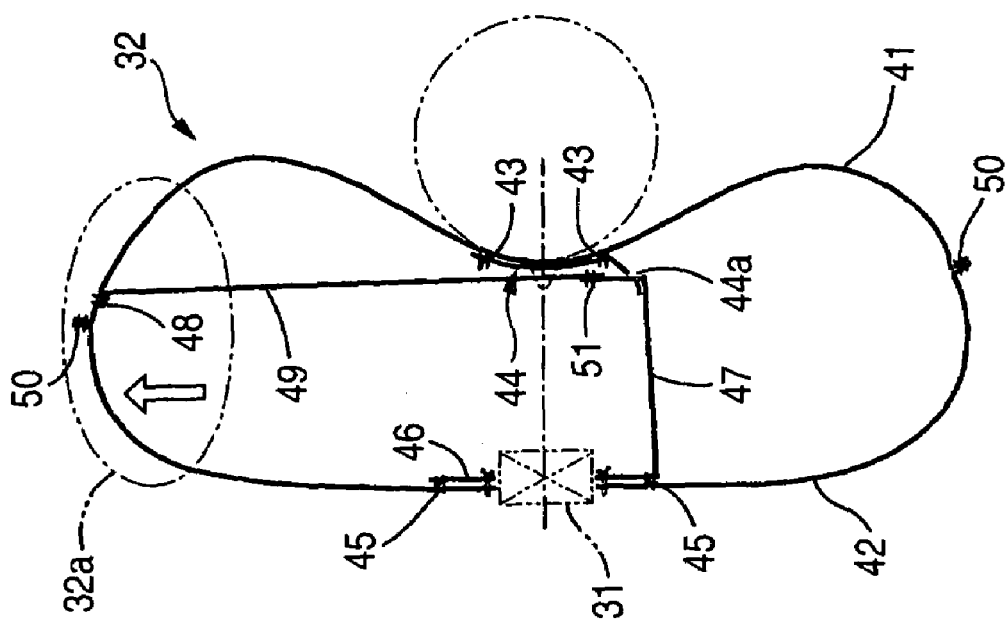
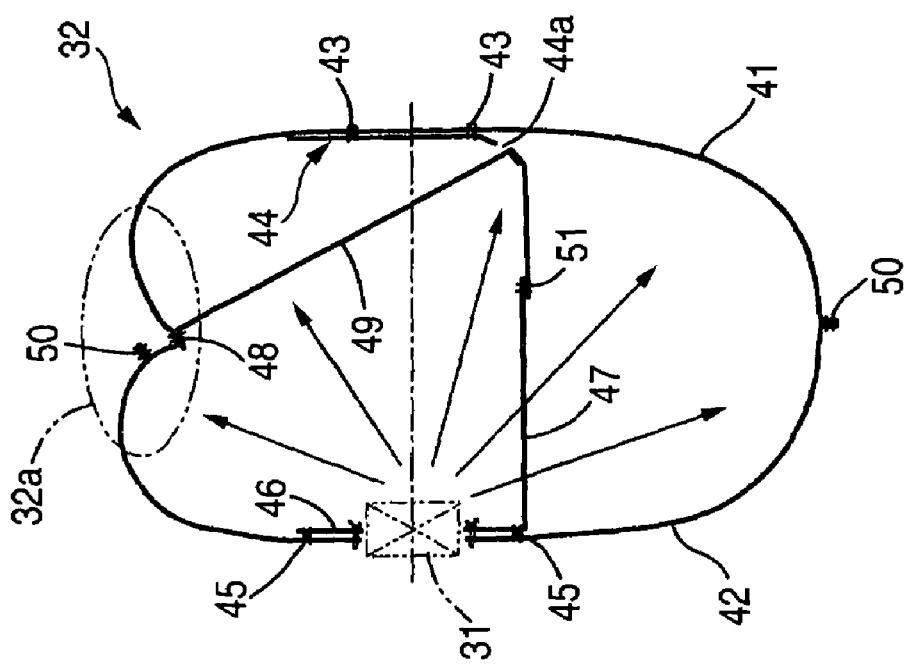

7,144,036 B2

AIR BAG APPARATUS

BACKGROUND OF THE INVENTION

1. Field of the Invention

The present invention relates to an air bag apparatus in which a strip is disposed in the interior of an air bag which is inflated with a gas generated by an inflator when a vehicle is involved in a collision, so that a deployment shape of the air bag is controlled by virtue of a tensile force acting on the strip.

2. Background Art

An air bag apparatus is known in Japanese Patent Publication No. 2666689 in which an air bag is constructed by sewing together two circular base fabrics around an outer circumferential portion thereof, wherein back sides of both the base fabrics are connected with four strips so as to generate a tensile force, so that the air bag is allowed to be deployed into a flat shape in a longitudinal direction of a vehicle.

SUMMARY OF THE INVENTION

Incidentally, since the strip used in the conventional air bag has the function to control the deployment shape of the air bag but does not have a function to control an internal pressure resulting when the air bag restrains the occupant, there has been caused a possibility that the occupant cannot be restrained softly.

The invention was made in view of the situation, and an object thereof is to enable both the deployment shape and internal pressure of the air bag to be controlled appropriately using strips.

To achieve the object, the invention provides an air bag apparatus, including: an inflator that generates a gas; an air bag that is inflated with the gas when a vehicle is involved in a collision, the air bag having a corner portion that is projectable radially outwardly and a guide portion that is provided on a back side of a surface to face an occupant of the vehicle; a strip that is disposed in an interior of the air bag so that a deployment shape of the air bag is controlled by virtue of a tensile force acting on the strip; wherein the strip has one end that is fixed to the corner portion; the air bag has a mounting portion at which the other end of the strip is fixed; and the strip is arranged to pass through the guide portion slidably to be fixed to the mounting portion at the other end thereof.

BRIEF DESCRIPTION OF THE DRAWINGS

The present invention may be more readily described with reference to the accompanying drawings:

FIG. 6A is a drawing illustrating a process of folding an air bag.

FIG. 6B is a drawing illustrating the process of folding the air bag.

FIG. 11A is a drawing explaining the operation of the air bag when deployed.

FIG. 11B is a drawing explaining the operation of the air bag when deployed.

DETAILED DESCRIPTION OF THE PREFERRED EMBODIMENTS

Hereinafter, a mode for carrying out the invention will be described based on an embodiment of the invention illustrated in the accompanying drawings.

Figure 1:
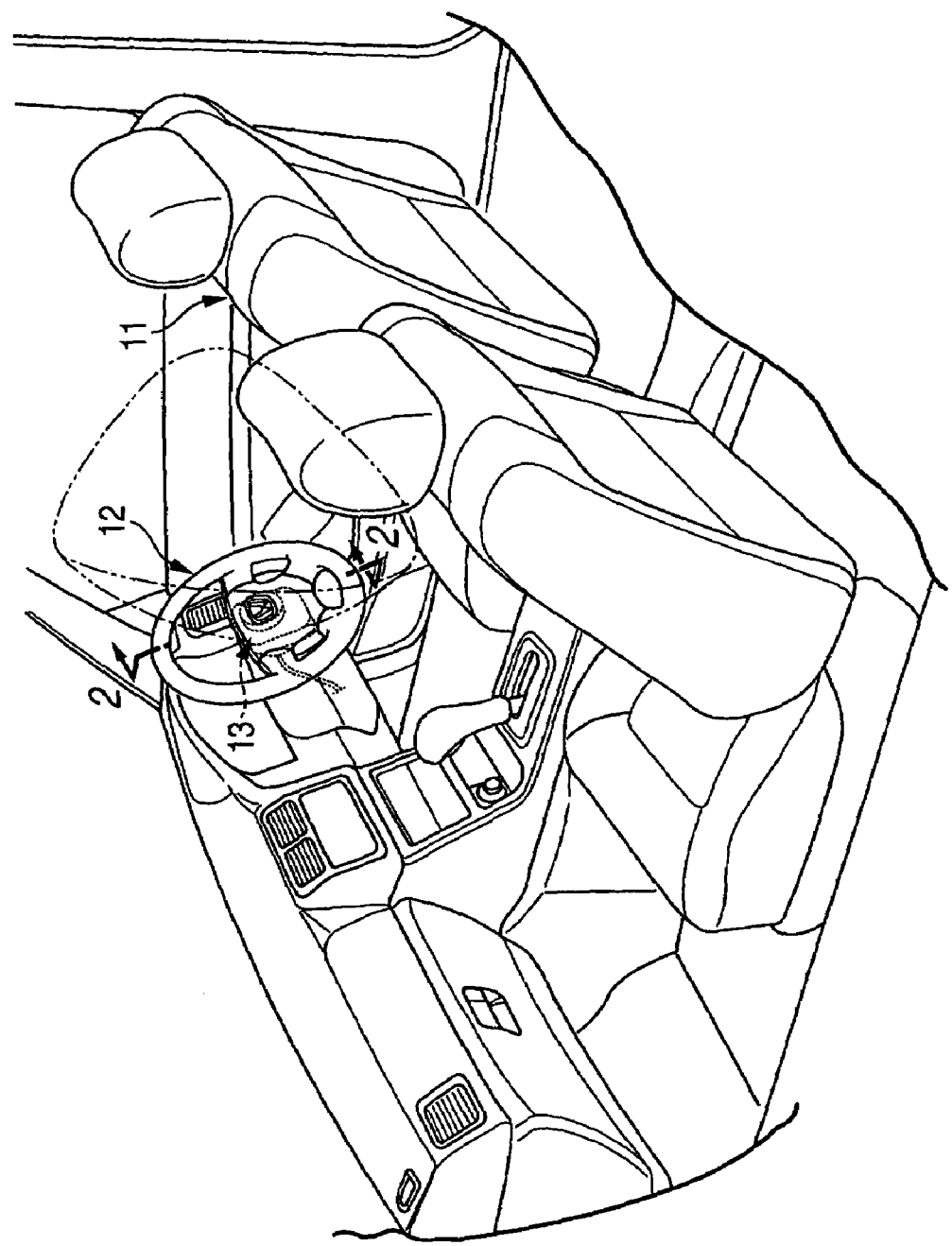
FIG. 1 is a perspective view of a front part of a passenger compartment of an automobile.
Figure 2:
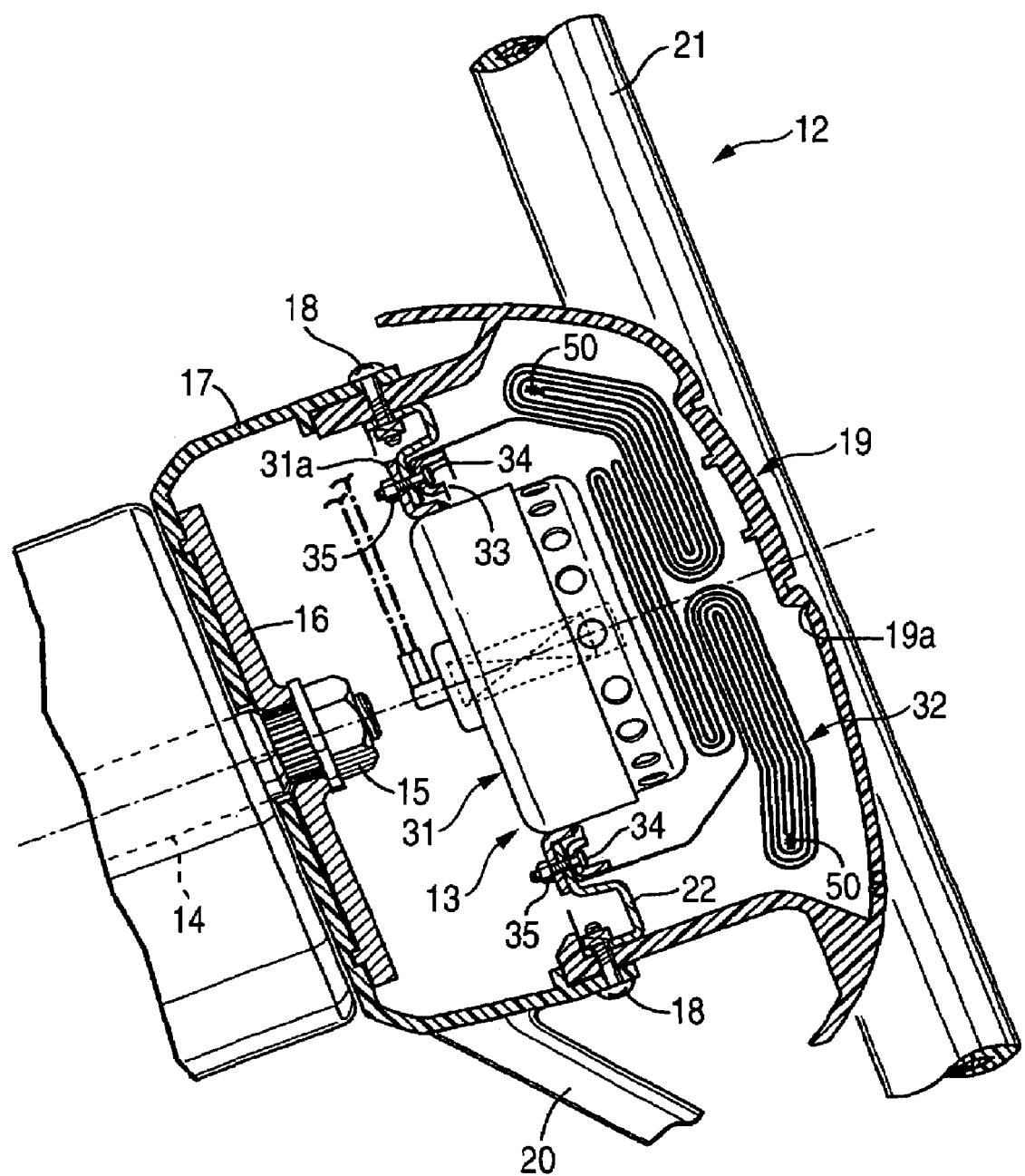
FIG. 2 is an enlarged cross-sectional view taken along the line 2—2 in FIG. 1.
Figure 3:
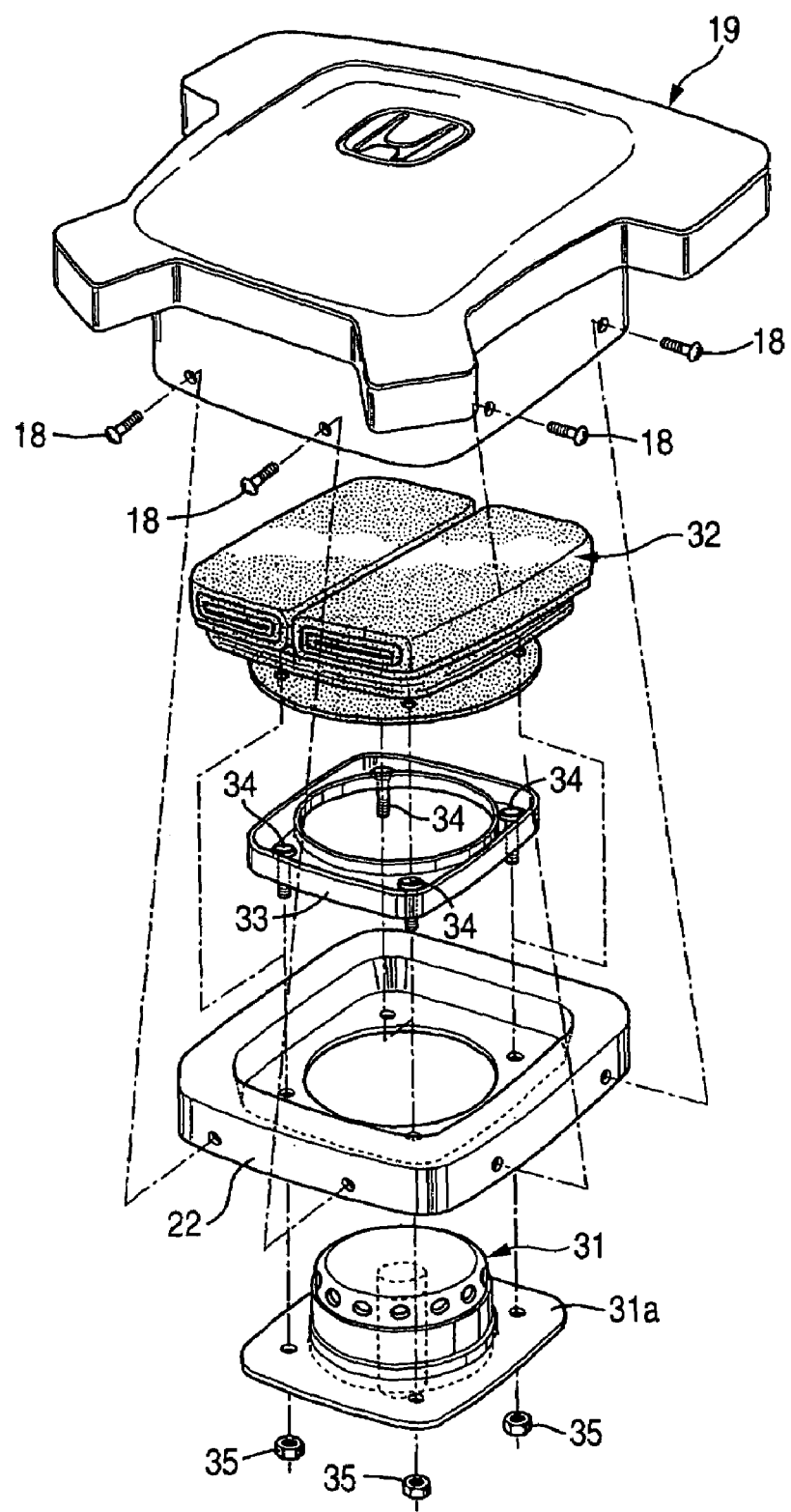
FIG. 3 is an exploded perspective view of an air bag module.
Figure 4B:
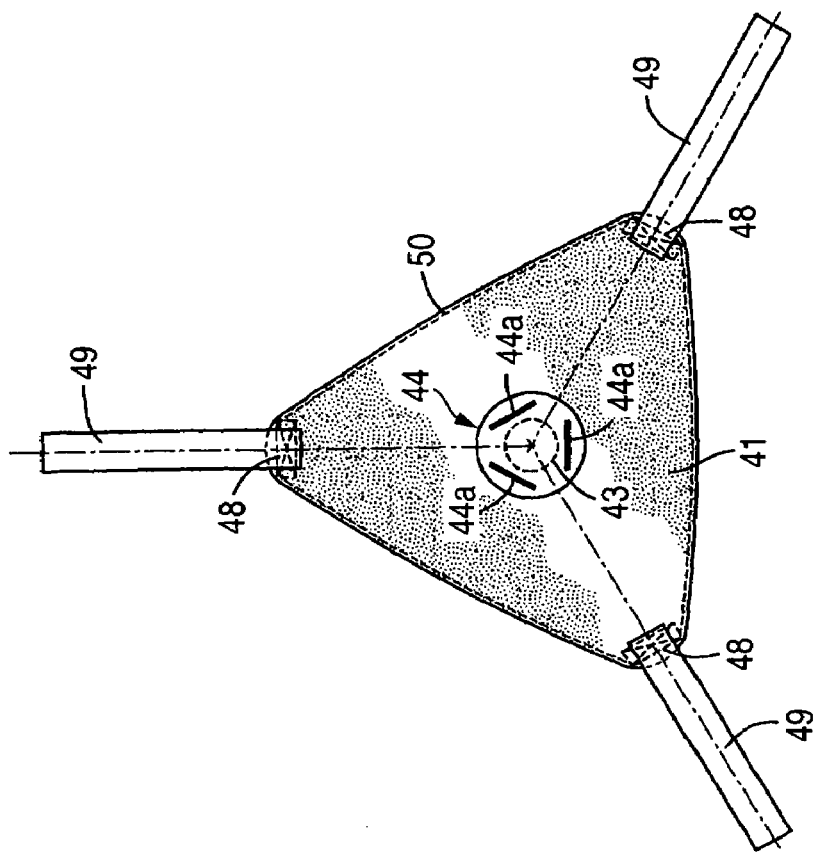
FIG. 4B is a drawing illustrating the process of assembling the first fabric.
Figure 4A:
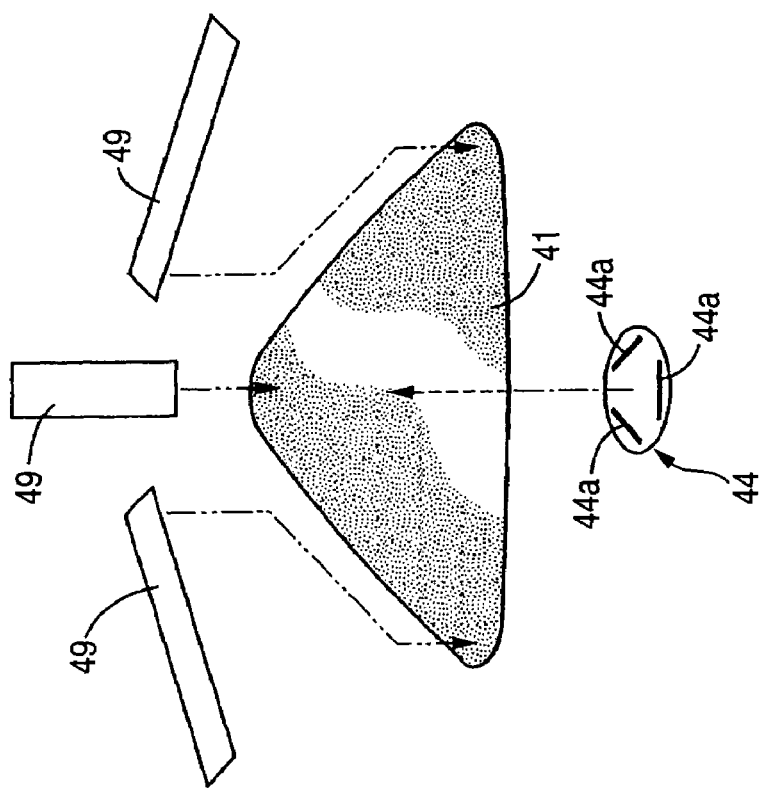
FIG. 4A is a drawing illustrating a process of assembling a first fabric.
Figure 5A:
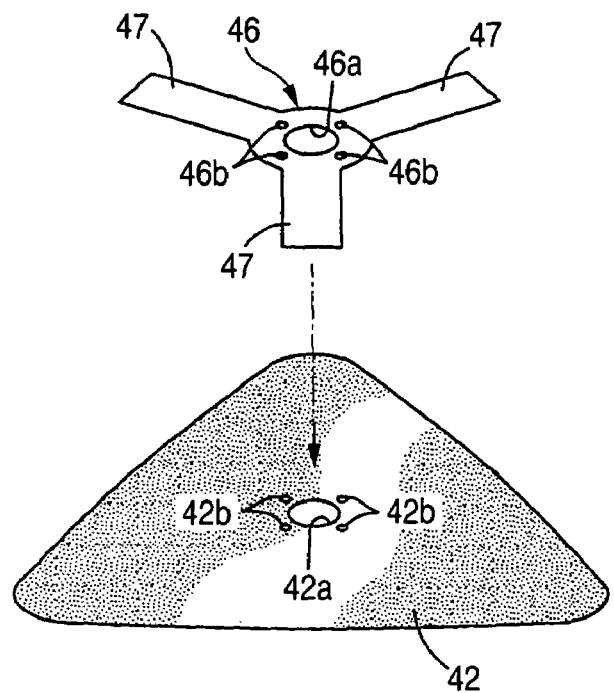
FIG. 5A is a drawing illustrating a process of assembling a second fabric.
Figure 5B:
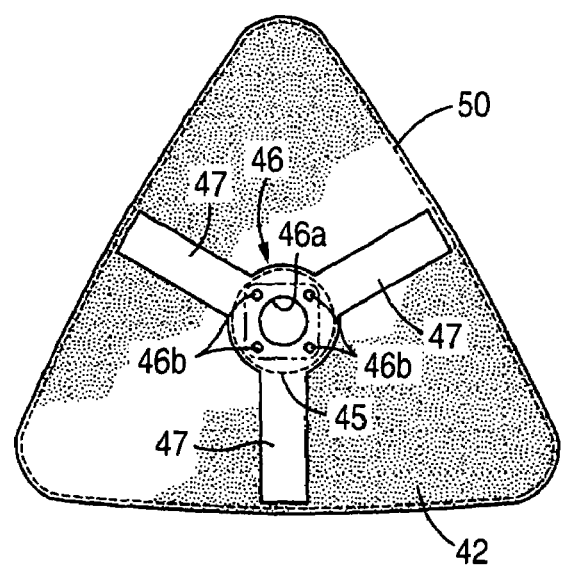
FIG. 5B is a drawing illustrating the process of assembling the second fabric.
Figure 7B:
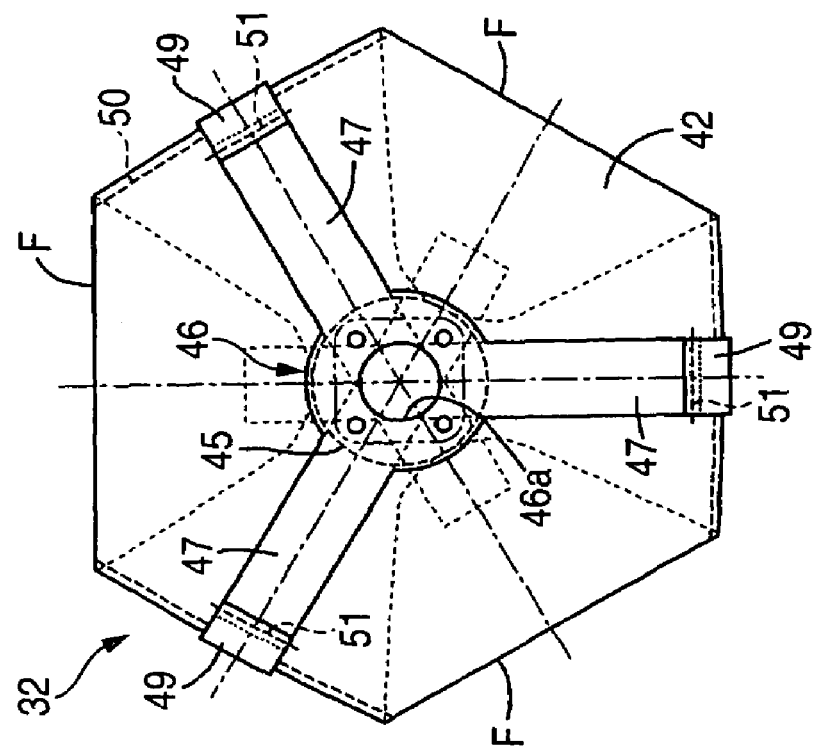
FIG. 7B is a drawing illustrating the air bag which has been folded completely.
Figure 7A:
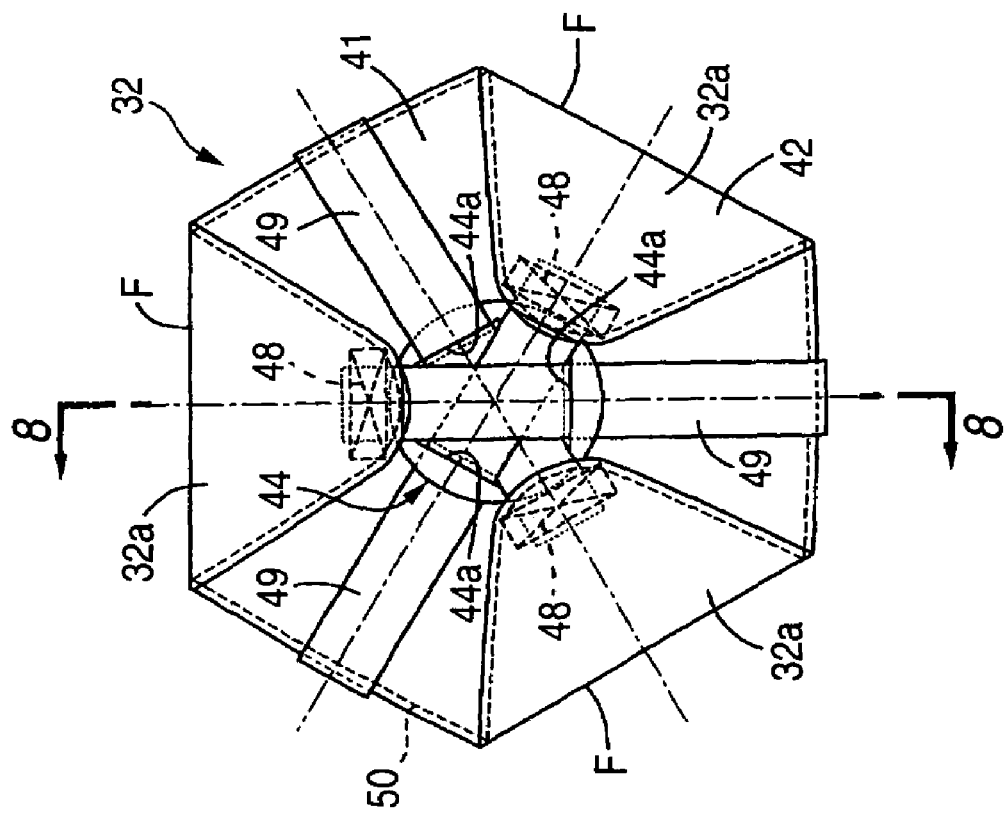
FIG. 7A is a drawing illustrating the air bag which has been folded completely.
Figure 8:
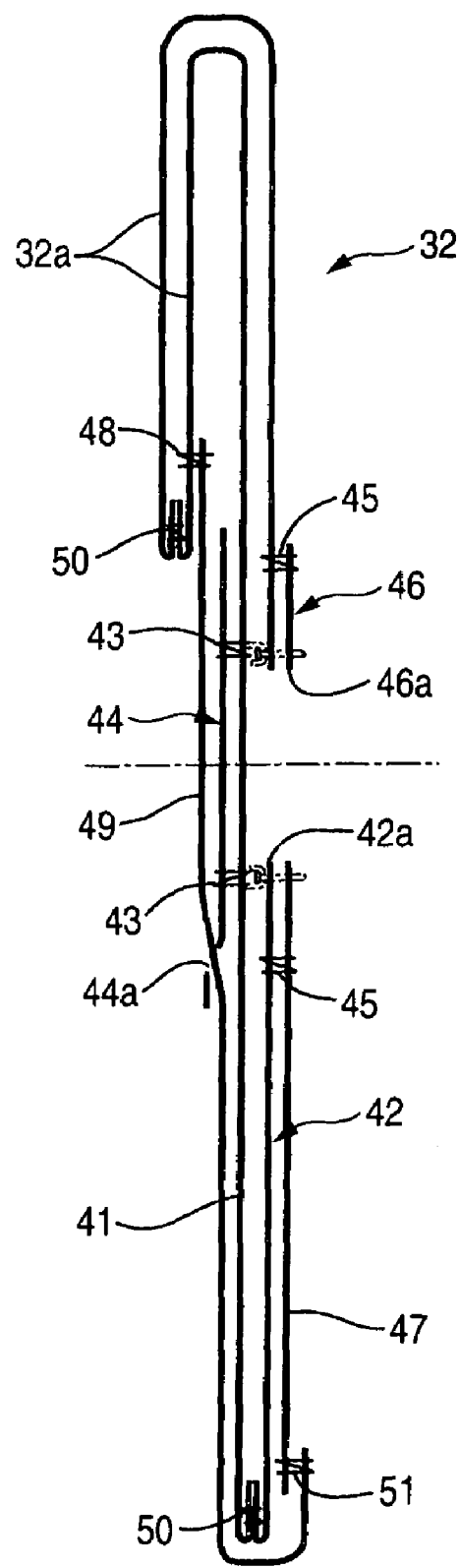
FIG. 8 is an enlarged cross-sectional view taken along the line 8—8 in FIG. 7.
Figure 9:
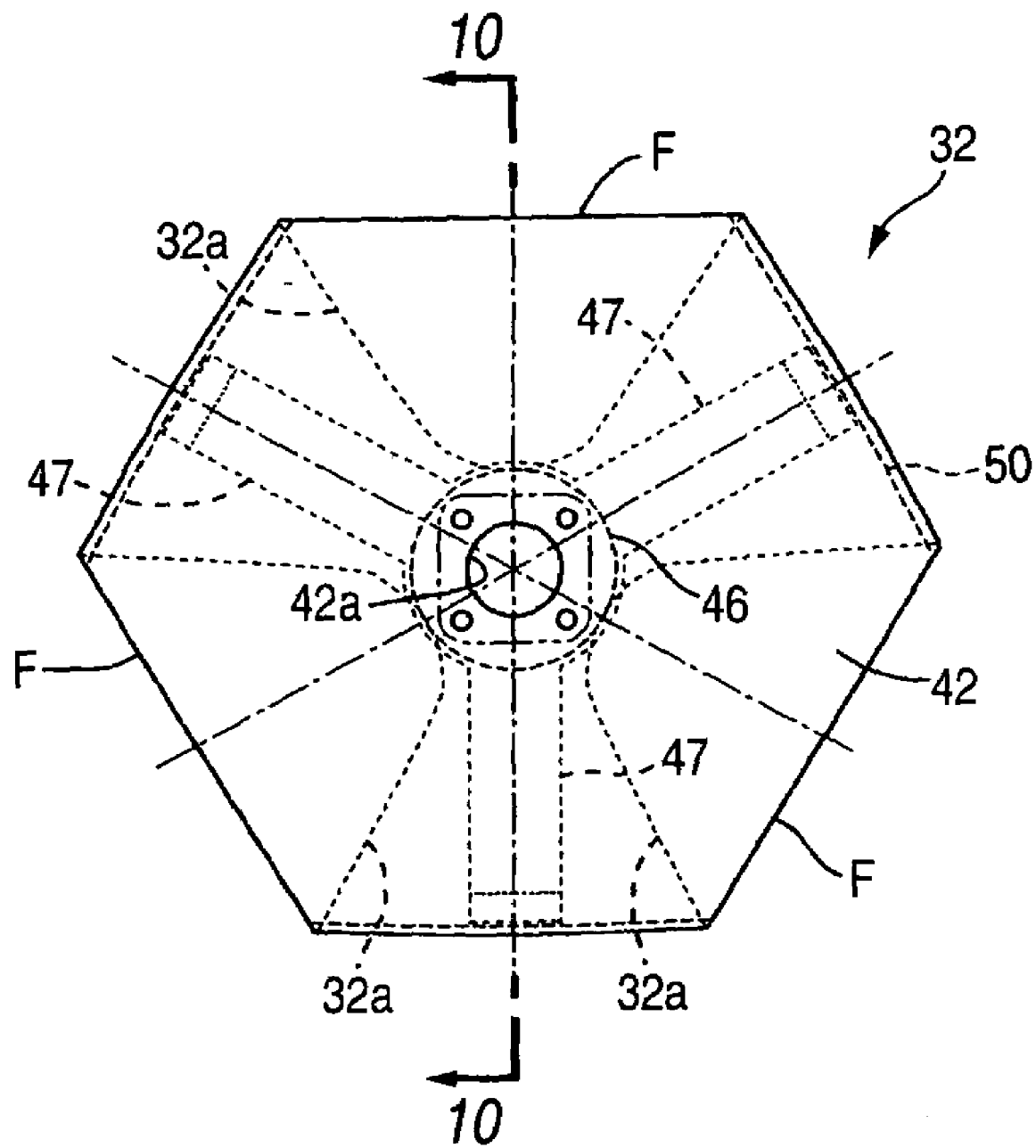
FIG. 9 is a drawing showing the air bag which has been turned inside out completely.
Figure 10:
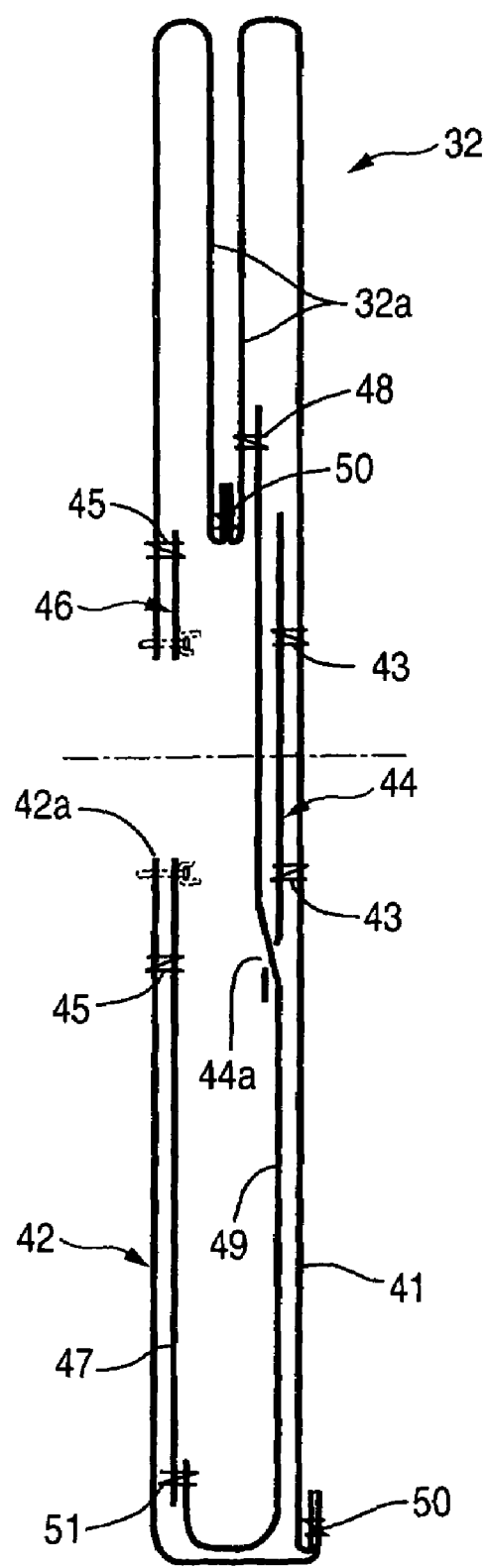
FIG. 10 is an enlarged cross-sectional view taken along the line 10—10 in FIG. 9.

FIGS. 1 to 5 show an embodiment of the invention, wherein FIG. 1 is a perspective view of a front part of a passenger compartment of an automobile, FIG. 2 is an enlarged cross-sectional view taken along the line 2—2 in FIG. 1, FIG. 3 is an exploded perspective view of an air bag module, FIGS. 4A and 4B are drawings illustrating a process of assembling a first fabric and FIGS. 5A and 5B are drawings illustrating a process of assembling a second fabric. In addition, FIGS. 6A and 6B are drawings illustrating a process of folding an air bag, FIGS. 7A and 7B are drawings illustrating the air bag which has been folded completely, FIG. 8 is an enlarged cross-sectional view taken along the line 8—8 in FIG. 7A, FIG. 9 is a drawing showing the air bag which has been turned inside out completely, FIG. 10 is an enlarged cross-sectional view taken along the line 10—10 in FIG. 9, and FIGS. 11A and 11B are drawings explaining the operation of the air bag when deployed.

As shown in FIG. 1, an air bag module 13 for a driver's seat 11 is accommodated in the interior of a steering wheel 12 disposed in front of the driver's seat.

As shown in FIGS. 2 and 3, the steering wheel 12 includes a boss portion 16 which is fixed to a rear end of a steering shaft 14 with a nut 15, a front cover 17 which is fixed to the boss portion 16, a rear cover 19 which is fixed to a back side of the front cover 17 with bolts 18 . . . , a plurality of spoke portions 20 . . . which extend radially from the front cover 17 and a steering wheel main body portion 21 which extends continuously along an outer circumference of the spoke portions 20 . . . A retainer 22 is also fastened to an inner circumferential surface of the rear cover 19 with the bolts 18 . . . , and the air bag module 13 is supported on the retainer 22. A thin tearing line 19a is formed in an inner side of the rear cover 19 in such a manner as to be torn when an air bag 32 is inflated. The retainer 22 functions as a mounting portion of the invention.

The air bag module 13 includes an inflator 31 filled with a propellant which generates a high-pressure gas when burned, the air bag 32 constructed by sewing together base fabrics and a fixing ring 33 for fixing a base portion of the air bag 32. A flange 31a of the inflator 31 and the fixing ring 33 are superimposed on front and rear surfaces of the retainer 22, respectively, and are then fastened together with bolts 34 ... and nuts 35 .... As this occurs, the base portion of the air bag 32 is held between the rear surface of the retainer 22 and a front surface of the fixing ring 33.

Next, the construction of the air bag 32 will be described based on FIGS. 4 to 6. Note that the air bag 32 is sewn in a state where front and back sides thereof are reversed, that is, in a state where the back side of the air bag 32 is exposed to the outside, and thereafter, the air bag so sewn is turned inside out so that the front side thereof is exposed to the outside.

The air bag 32 includes a first base fabric 41, which is formed into a triangular shape and is situated a rear side. (a side facing the occupant) of the air bag 32, a second base fabric 42, which is formed into the same shape as that of the first base fabric 41 and is superimposed on a front surface of the first base fabric 41, a circular auxiliary fabric 44 which is sewn 43 to a center of a back surface of the first base fabric 41 and in which three slits 44a . . . are formed, a circular gathering portion 46, which is sewn 45 to a center of a back surface of the second base fabric 42, three first strips 47 . . . , which extend radially from the gathering portion 46 at an interval of 120°, and three second strips 49 . . . , which are sewn 48 to three corner portions (apexes of the triangle) of the first base fabric 41, respectively. A circular opening 46a and four bolt holes 46b . . . which surround the opening 46a are formed in the center of the gathering portion 46, and a circular opening 42a and four bolt holes 42b . . . which surround the opening 42a are formed in a central portion of the second base fabric 42. The first strips 47 and the second strips 49 function as a strip of the invention.

The air bag 32 is assembled in the following procedure.

In a first process, as shown in FIGS. 4A and 4B, the auxiliary fabric 44 is sewn 43 to the central portion of the back surface of the first base fabric 41, and the three second strips 49 . . . are sewn 48 to the three portions.

In a second process, as shown in FIGS. 5A and 5B, the gathering portion 46 of the three first strips 47 . . . is sewn 45 to the central portion on the back surface of the second base fabric, whereby the opening 42a and the bolt holes 42b . . . in the second base fabric 42 come to coincide with the opening 46a and the bolt holes 46b in the gathering portion.

In a third process, the first base fabric 41 and the second base fabric 42 are sewn 50 together along an outer circumferential portion so as to constitute the air bag 32. Note that the sequence of the first and second processes may be reversed and that the sewing 48 of the three second strips 49 . . . performed in the first process may happen at the same time that the outer circumferential portions of the first and second base fabrics 41, 42 are sewn 50 together in the third process.

In a fourth process, as shown in FIGS. 6A and 6B, the corner portions 32a of the air bag 32 are folded at folding lines F onto the first base fabric 41, and a distal end of the second strip 49 sewn 48 to the corner portion 32a is passed through the slit 44a in the auxiliary fabric 44 and thereafter is sewn 51 to a distal end of the first strip 47. This work is repeated three times for the three pairs of first and second strips 47, 49, whereby the triangular air bag 32 is transformed into a hexagonal shape, as shown in FIG. 7. As this occurs, as shown in FIG. 8, the auxiliary fabric 44, the gathering portion 46, the first strips 47 . . . and the second strips 49 . . . are situated outside the air bag 32.

In a fifth process, as shown in FIG. 9, the air bag 32 is turned inside out through the opening 42a in the second base fabric 42. As a result, as shown in FIG. 10, the auxiliary fabric 44, the gathering portion 46, the first strips 47 . . . and the second strips 49 . . . are then accommodated inside the air bag 32.

Thus, the air bag 32, which has been completed as has been described above, is folded further in a suitable sequence into a smaller shape, and the opening 42a in the second base fabric 42 and the opening 46a in the gathering portion 46 of the air bag 32 are held between the retainer 22 and the fixing ring 33 to be fixed in place thereat.

Thus, in the event that an acceleration of a predetermined value or larger is detected when the vehicle is involved in a collision, the air bag 32 is inflated with a gas generated by the inflator 31 and then deploy into the interior of the passenger compartment through an opening formed when the tearing line 19a in the rear cover 19 so as to restrain the occupant. FIG. 11A shows a shape of the air bag 32 resulting immediately after the deployment thereof. Since the other ends of the second strips 49 . . . , which are passed through the slits 44a . . . in the auxiliary fabric 44 so as to be sewn 48 . . . to the corner portions 32a of the air bag 32 at one ends thereof, are sewn 51 . . . for connection, respectively, to the other ends of the first strips 47., which are connected to the gathering portion at one ends thereof, a tensile force is generated on the first and second strips 47 . . . , 49 . . . so that the air bag 32 is allowed to deploy into a suitable deployment shape for restraint of the occupant, which is flat in the longitudinal direction.

As shown in FIG. 11B, when the occupant, who is moved forward by virtue of inertia as a result of collision, comes into abutment with the front surface (the occupant restraining surface) of the first base fabric 41 of the air bag 32, the front surface of the first base fabric 41 flexes forward by virtue of a load applied by the occupant, whereby the tensile force on the first and second strips 47 . . . , 49 . . . are reduced. As a result, the second strips 49 . . . slide through the slits 44a . . . in the auxiliary fabric 44, whereby the three corner portions 32a of the air bag 32 are caused to expand radially outwardly as indicated by an thick white arrow to thereby suppress the increase in internal pressure of the air bag 32, thereby making it possible to restrain the occupant softly.

Thus, as has been described heretofore, by adopting the first and second strips 47 . . . , 49 . . . of the embodiment, not only can the shape of the air bag 32 at the time of deployment be controlled appropriately but also the internal pressure resulting when the deployed air bag restrains the occupant can be controlled appropriately.

While the embodiment of the invention has been described heretofore, the invention can be modified in various ways with respect to the design thereof without departing from the spirit and scope thereof.

For example, while, in the embodiment, the air bag apparatus is described as being accommodated in the interior of the steering wheel 12, the invention can be applied to an air bag apparatus such as a front seat passenger air bag that can be used for any other applications.

In addition, while, in the embodiment, the air bag 32 is describe as being of the triangular shape having the three corner portions 32a . . . , the number of corner portions 32a . . . is not limited to the number used in the embodiment. However, with three or more corner portions 32a . . . , the shape of the air bag 32 resulting when deployed can become a well balanced polygonal shape.

Furthermore, while, in the embodiment, the guide portion for guiding the second strips 49 . . . in the sliding fashion is described as being constituted by the slits 44a . . . which are formed in the auxiliary fabric 44, guide portions of any other constructions can be adopted. However, by adopting the slits 44a . . . in the embodiment, the guide of the sliding second strips 49 . . . can be ensured with the simple construction.

According to the embodiment, since the strip which is fixed to the corner portion at one end thereof is arranged to pass through in a sliding fashion the guide portion which is provided on the back side of the surface of the air bag which faces the occupant of the vehicle so as to be fixed to the mounting portion of the air bag at the other end thereof, the deployment shape of the air bag can appropriately be controlled by virtue of the tensile force acting on the strip when the air bag is deployed. In addition, since the strip gets loosened to allow the corner portion of the air bag to expand radially outwardly when the surface of the air bag which faces the occupant-restrains the occupant to thereby increase the internal pressure of the air bag, the increase in the internal pressure can be suppressed so that the occupant can be restrained softly.

According to the embodiment, since the guide portion is made up of the slit in the auxiliary fabric fixed to the back side of the surface of the air bag which faces the occupant of the vehicle, the sliding of the strip can be guided securely with the simple construction.

According to the embodiment, since the air bag has at least three corner portions which are disposed at regular intervals in the circumferential direction, the air bag is allowed to deploy into a regular polygon, which is a well-balanced shape.

What is claimed is:

1. An air bag apparatus, comprising:
   an inflator that generates a gas;
   an air bag that is inflated with the gas when a vehicle is involved in a collision, the air bag having a corner portion that is projectable radially outwardly and a guide portion that is provided on a back side of a surface to face an occupant of the vehicle;
   a strip that is disposed in an interior of the air bag so that a deployment shape of the air bag is controlled by virtue of a tensile force acting on the strip;
   wherein the strip has one end that is fixed to the corner portion;
   the air bag has a mounting portion at which the other end of the strip is fixed; and
   the strip is arranged to pass through the guide portion slidably to be fixed to the mounting portion at the other end thereof.

2. The air bag apparatus as claimed in claim 1, further comprising: an auxiliary fabric fixed to the back side;
   wherein the guide portion includes a slit formed in the auxiliary fabric.

3. The air bag apparatus as claimed in claim 1,
   wherein the corner portion includes at least three corner portions that are disposed at regular intervals in a circumferential direction.

* * * * *